US012734761B2

(12) United States Patent
Fox et al.

(10) Patent No.: US 12,734,761 B2
(45) Date of Patent: Sep. 15, 2026

(54) SPLITTING MULTIDIMENSIONAL PRINTING MODELS BASED ON VULNERABILITY METRICS

(71) Applicant: INTERNATIONAL BUSINESS MACHINES CORPORATION, Armonk, NY (US)

(72) Inventors: Jeremy R. Fox, Georgetown, TX (US); Jessica Nahulan, Markham (CA); Carolina Garcia Delgado, Zapopan (MX); Tiberiu Suto, Franklin, NY (US)

(73) Assignee: International Business Machines Corporation, Armonk, NY (US)

( * ) Notice: Subject to any disclaimer, the term of this patent is extended or adjusted under 35 U.S.C. 154(b) by 490 days.

(21) Appl. No.: 18/351,904

(22) Filed: Jul. 13, 2023

(65) Prior Publication Data

US 2025/0018657 A1 Jan. 16, 2025

(51) Int. Cl.

*B29C 64/393* (2017.01)
*G06F 3/12* (2006.01)
*B33Y 50/02* (2015.01)

(52) U.S. Cl.

CPC ............ *B29C 64/393* (2017.08); *G06F 3/121* (2013.01); *G06F 3/1256* (2013.01); *B33Y 50/02* (2014.12)

(58) Field of Classification Search

None

See application file for complete search history.

(56) References Cited

U.S. PATENT DOCUMENTS

| | | | | |
|---|---|---|---|---|
| 7,313,777 | B1 | 12/2007 | Yang et al. | |
| 8,713,519 | B2 * | 4/2014 | Lininger | G06F 3/048 717/109 |
| 9,636,871 | B2 | 5/2017 | Butler et al. | |
| 9,846,556 | B2 | 12/2017 | Cudak et al. | |
| 10,000,024 | B2 | 6/2018 | Jang | |

(Continued)

FOREIGN PATENT DOCUMENTS

| | | | | |
|---|---|---|---|---|
| CN | 110119255 A | | 8/2019 | |
| CN | 216658924 U | | 6/2022 | |
| CN | 114818401 A | * | 7/2022 | G06F 30/27 |

OTHER PUBLICATIONS

Beamler, "Printability Check", Beamler.com, May 5, 2018, 9 pgs, Retrieved from the Internet: <https://www.beamler.com/printability-check/>.

(Continued)

*Primary Examiner* — Jason Lin
(74) *Attorney, Agent, or Firm* — Teddi E. Maranzano

(57) ABSTRACT

A computer-implemented method, a computer system and a computer program product split a virtual printing model according to a probability of multidimensional printing failure. The method includes obtaining a virtual printing model of a multidimensional object, where the virtual printing model comprises print layers. The method also includes determining that a printing risk score for a location on the multidimensional object is above a printing risk threshold. The method further includes mapping a set of print layers of the virtual printing model to the location on the multidimensional object. Lastly, the method includes sending the print layers of the virtual printing model to a multidimensional printer, wherein a mapped set of print layers is sent first.

17 Claims, 2 Drawing Sheets

(56) References Cited

U.S. PATENT DOCUMENTS 10,611,086 B2 * 4/2020 Gain ..................... B29C 64/386
10,692,185 B2 6/2020 Wang
2012/0105903 A1 * 5/2012 Pettis ..................... H04N 1/603 358/1.14
2014/0058959 A1 * 2/2014 Isbjornssund ........ G06Q 50/184 705/310
2014/0074274 A1 * 3/2014 Douglas ................ B29C 64/118 700/105
2014/0291886 A1 * 10/2014 Mark ..................... B33Y 10/00 264/259
2015/0321425 A1 * 11/2015 Stava ..................... B33Y 30/00 700/98
2016/0086258 A1 * 3/2016 Romes ............... G06Q 30/0641 705/27.1
2016/0210312 A1 * 7/2016 Webb ................. G06Q 30/0635
2017/0031639 A1 * 2/2017 Cudak ................... G06F 3/1284
2017/0220946 A1 8/2017 Thielen et al.
2018/0260089 A1 * 9/2018 Hudson ................... G06F 21/10
2019/0278254 A1 * 9/2019 Kumar ............... G05B 19/4099
2020/0167648 A1 * 5/2020 Siegl ......................... G06T 7/11
2022/0138500 A1 5/2022 Levinshtein
2022/0297380 A1 9/2022 Lipowitch
2022/0301106 A1 9/2022 Liu
2022/0392156 A1 12/2022 Yngesjö
2024/0157652 A1 * 5/2024 Reddy ................... G06T 7/0004

OTHER PUBLICATIONS

CDI, "3D & 4D Technology Market Is Expected to Reach USD 931.17B", Contrive Datum Insights, Globenewswire.com, [accessed Jun. 6, 2023], 8 pgs., Retrieved from the Internet: <https://www.globenewswire.com/en/news-release/2023/03/09/2624521/0/en/3D-4D-Technology-Market-Is-Expected-To-Reach-USD-931-17-Billion-by-2030-Grow-at-a-CAGR-Of-20-38-during-Forecast-Period-2023-To-2030-Data-By-Contrive-Datum-Insights-Pvt-Ltd.html>.

IBM, "3D Printing in the Transportation Industry", IBM.com, [accessed Jun. 6, 2023], 5 pgs., Retrieved from the Internet: <https://www.IBM.com/thought-leadership/institute-business-value/en-us/report/3d-printing>.

Menon, et al., "PULSE: Self-Supervised Photo Upsampling via Latent Space Exploration of Generative Models", arXiv:2003.03808v3 [cs.CV], Jul. 20, 2020, 20 pgs.

* cited by examiner

SPLITTING MULTIDIMENSIONAL PRINTING MODELS BASED ON VULNERABILITY METRICS

BACKGROUND

Embodiments relate generally to the field of multidimensional printing and, more specifically, to splitting a multidimensional printing model to print a corresponding multidimensional object according to an order based on vulnerability metrics of the printing model.

Multidimensional printing, e.g., three-dimensional (3D) or 4D printing, is the process of making multidimensional objects that are derived from a digital file. A user may first generate or select a virtual model that corresponds with the multidimensional object of interest to the user, where the preparation of printing the multidimensional object may include splitting the virtual model into hundreds or thousands of horizontal print layers. As a result, the actual printing of the multidimensional object may be accomplished by reading each of the print layers and then printing the multidimensional object layer by layer. In addition, various printing material mediums, known as "filaments," and methods may be used by a multidimensional printer to complete the physical multidimensional object. Some examples of filaments may include plastic, metal, sand, biomaterials, or ceramics, while examples of methods may include melting or softening the filaments to produce the print layers, such as Selective Laser Sintering (SLS) and Fused Deposition Modeling (FDM), or curing and solidifying a liquid medium into a solid multidimensional object, e.g., Stereo Lithography (SLA).

SUMMARY

An embodiment is directed to a computer-implemented method for splitting a multidimensional print job according to a probability of multidimensional printing failure. The method may include obtaining a virtual printing model of a multidimensional object, wherein the virtual printing model comprises print layers. The method may also include determining that a printing risk score for a location on the multidimensional object is above a printing risk threshold. The method may further include mapping a set of print layers of the virtual printing model to the location on the multidimensional object. Lastly, the method may include sending the print layers of the virtual printing model to a multidimensional printer, wherein a mapped set of print layers is sent first.

In another embodiment, the method may include determining that a first printing risk score for a first location on the multidimensional object is higher than a second printing risk score for a second location on the multidimensional object, where both the first printing risk score and the second printing risk score are above the printing risk threshold. The method may also include identifying a first set of print layers of the virtual printing model mapped to the first location on the multidimensional object and a second set of print layers of the virtual printing model mapped to the second location on the multidimensional object. Lastly, the method may include sending the first set of print layers of the virtual printing model to the multidimensional printer prior to the second set of print layers of the virtual printing model.

In a further embodiment, the determining that the printing risk score for the location on the multidimensional object is above the printing risk threshold may use a machine learning model that predicts the probability of printing failure based on crowdsourced object printing failure data.

In yet another embodiment, the method may include displaying the virtual printing model of the multidimensional object to a user, wherein a displayed virtual printing model includes an indication of the location on the multidimensional object. The method may also include monitoring user interactions with the location on the multidimensional object. Lastly, the method may include updating the printing risk score for the location on the multidimensional object based on the user interactions.

In still another embodiment, where the multidimensional printer comprises a first printer and a second printer, the method may also include sending the mapped set of print layers to the first printer and remaining print layers of the virtual printing model to the second printer and, in response to detecting a print failure at the first printer, blocking the second printer from printing the remaining print layers of the virtual printing model.

In another embodiment, the method may include identifying a type of the multidimensional object and updating the printing risk score based on an identified type of multidimensional object.

In a further embodiment, the method may include generating a recommendation for a filament material to be used at the location on the multidimensional object based on the printing risk score for the location on the multidimensional object.

In addition to a computer-implemented method, additional embodiments are directed to a computer system and a computer program product for splitting a multidimensional print job according to a probability of multidimensional printing failure.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
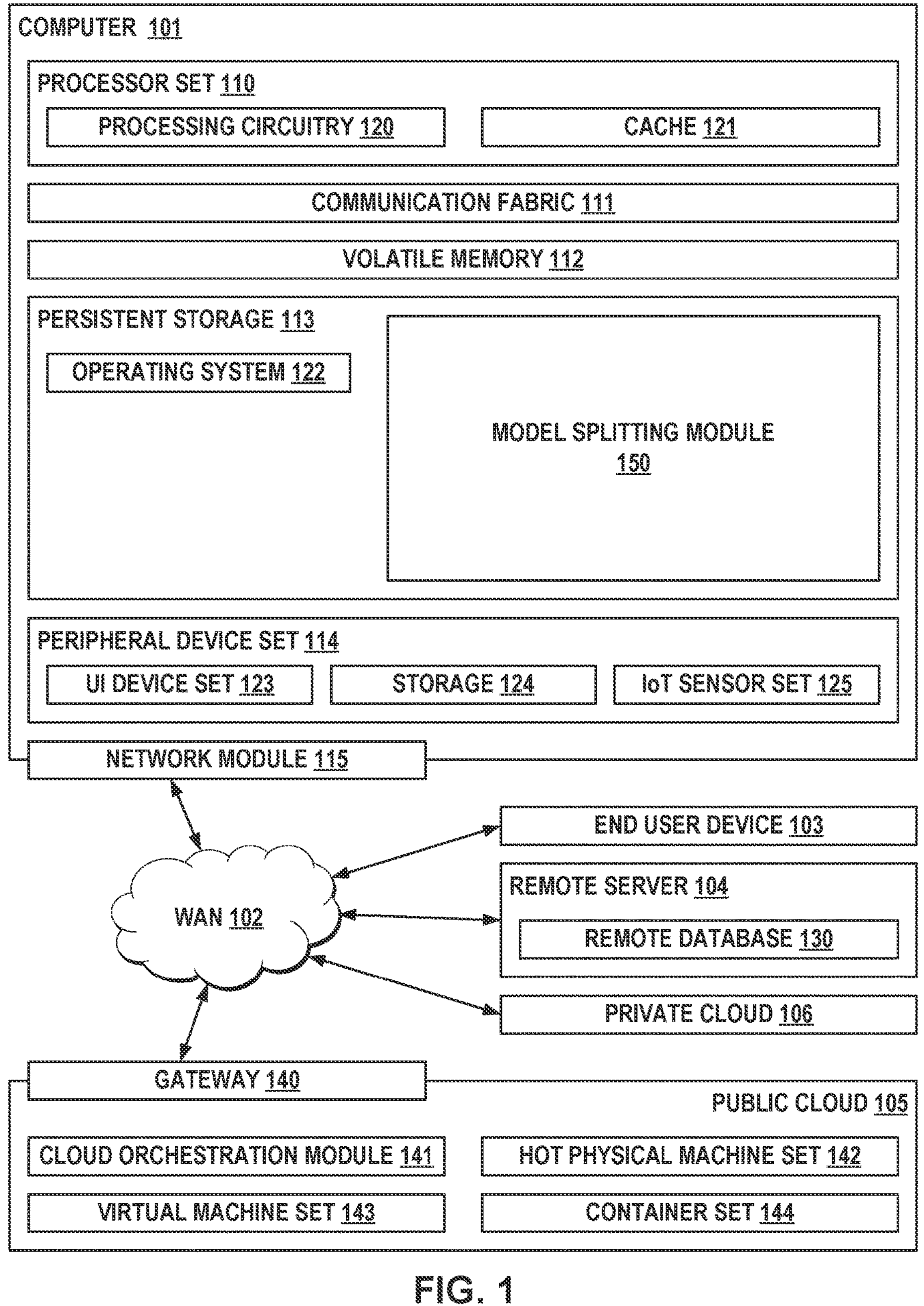
FIG. 1 depicts a block diagram of an example computer system in which various embodiments may be implemented.

Multidimensional (3D/4D) printing has become increasingly popular in the current technological ecosystem, allowing users to actualize real physical objects from virtual printing models stored on computers as digital files and used by software such as Computer-Aided Design (CAD) programs. However, 3D/4D printers have a reputation for low reliability, with many printers having a failure rate as high as 70 percent. There may be numerous reasons for a 3D print job to fail, for example the virtual printing model itself might not be very "printable", meaning that attributes including but not limited to model wall thickness, orientation, strength, and model density may not be optimal for printing with the current printer or the filaments that may be available to the user.

Multidimensional printing may be a costly endeavor when the filaments used to print multidimensional objects and the time spent in the printing process are considered. If a single portion of a multidimensional object is printed poorly, the entire multidimensional object and time that went into production may be wasted. For example, a multidimensional printer may print a toy action figure, but poorly print the details of figure's face, which may cause the user to discard the entire action figure. As a result, though the filament used in the print job may be melted and reused in another print job, there is still a loss of time and additional wear on the multidimensional printer. Typically, a user would need to visually inspect a printed object themselves and, should flaws or bad prints be found, a new print job using the same virtual printing model may need to be initiated and these reprints, as mentioned, may quickly add up to a significant cost to the user.

It may therefore be useful to provide a method or system to intelligently split a virtual printing model into sections based on a probability (or likelihood) of print failure, where the sections may be derived from the print layers used by the multidimensional printer and include knowledge about the printer and the object itself. Such knowledge may be obtained from a database of prior attempts to print the object, both attempts on the actual printer being used currently or also from a broader network of users attempting to print the specific object on the same or similar model of printer, and the results may be shared with the network of users or stored in a database for later use. The knowledge may then use vulnerability metrics to determine the sections of the virtual printing model, where the sections may effectively split the multidimensional object into component print jobs ordered by vulnerability to print failure. Such a method or system would enable the sections with the highest probability of failure to be printed early in the print process, resulting in less wasted filament and time, and also may improve the efficiency of 3D/4D printers or software programs that may be used to facilitate the printing of multidimensional objects. As a result of the embodiments disclosed herein, the time and resource cost on the user when a 3D/4D print job has a high probability of failure due to the design of the virtual printing model may be reduced.

Referring to FIG. 1, computing environment 100 contains an example of an environment for the execution of at least some of the computer code involved in performing the inventive methods, such as model splitting module 150. In addition to model splitting module 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and model splitting module 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in model splitting module 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in model splitting module 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of VCEs will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Computer environment 100 may be used to split a virtual printing model according to a probability of multidimensional printing failure. In particular, the model splitting module 150 may obtain a virtual printing model of a multidimensional object, which may be comprised of print layers. Multidimensional objects or printers, as disclosed herein, may be used to describe a 3D or 4D printing environment, where software may be deployed to render a virtual printing model, or print job, into a physical object using filaments or other material as described above. It may be common for such software, in tandem with the multidimensional printer, to split the objects into hundreds, and even thousands, of print layers to fulfill a print job. These print layers may represent various locations of the object, such that sets of print layers may represent a certain portion of the multidimensional object. As an example, if the multidimensional object were an hourglass, the wider area at the top may include one set of print layers, the thin area between the two chambers may be another set of print layers and the bottom may be another set of print layers. It should be noted that the print layers, and therefore any set of print layers, may be an appropriate size and shape as required by the multidimensional printer or object involved in a specific print job, as the software program that may be used to print an object may do normally without the model splitting module 150.

The virtual printing model may be scanned and vulnerable locations on the multidimensional object, or locations that may have a high probability of printing failure, may be identified. A machine learning model may be trained to predict printing failure risk based on information about the printer or the object, including print jobs that may have been completed on the printer to be used or crowdsourcing information about prior attempts to print the multidimensional object by other users on any printer. The machine learning model may generate a risk probability, or risk score and a printing risk threshold may be independently generated, above which any risk score, or level of probability of printing risk, may be considered high, which would classify the analyzed location as vulnerable. Each vulnerable location may then be mapped to a set of print layers within the virtual printing model and each set of print layers may be identified in some fashion as representing respective vulnerable locations. When the object is printed and the print layers are to be sent to multidimensional printer, the identified sets of print layers may be sent to the printer by the model splitting module 150 first, such that vulnerable locations of the object may be printed first. In ordering the print layers sent to the printer, failures may occur early in the printing process and the print job may waste less time and material in printing most of an object and then failing to complete the print job, when a failure at any point may cause the materials to be discarded.

Figure 2:
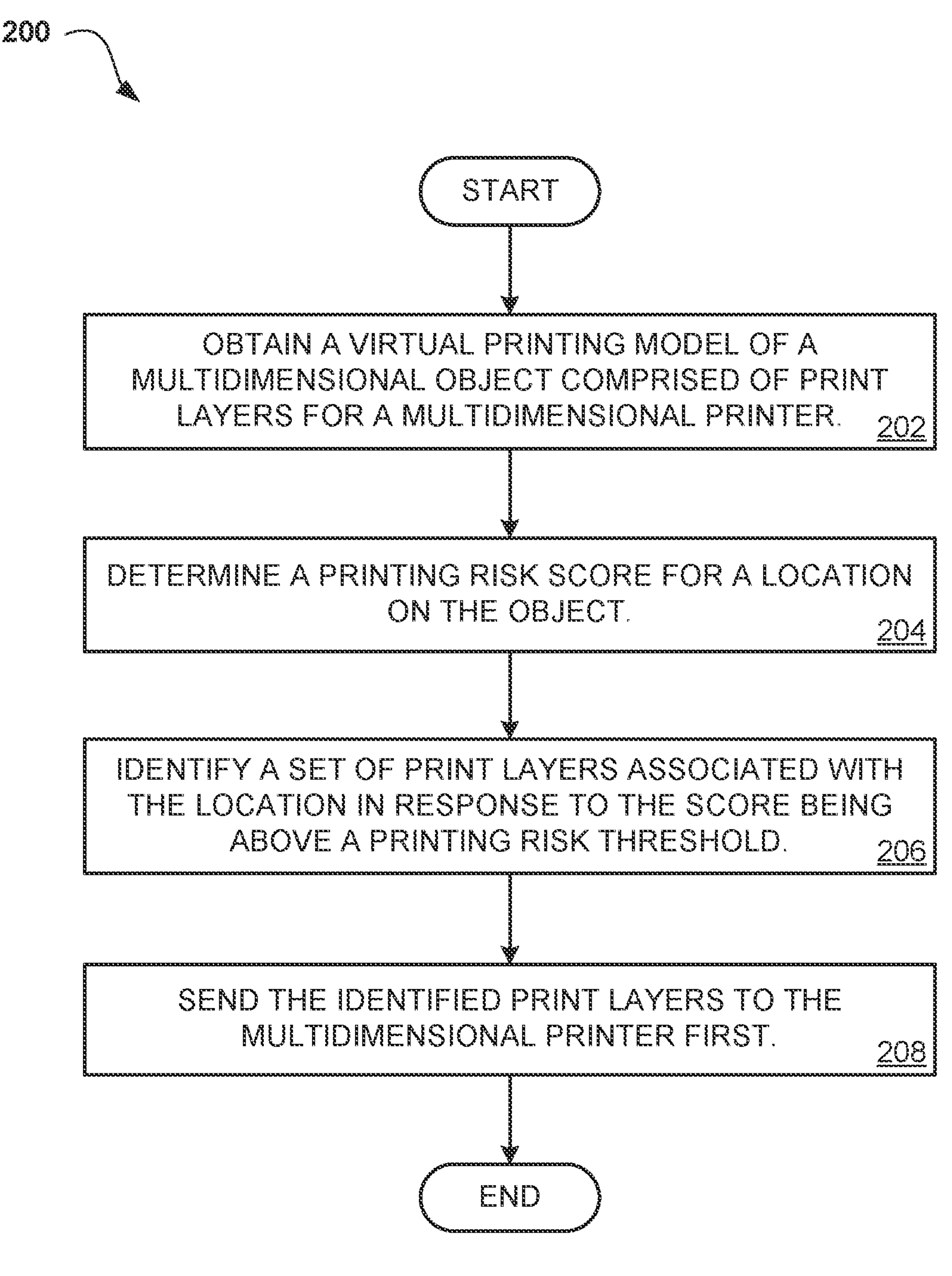
FIG. 2 depicts a flow chart diagram for a process that splits a virtual printing model according to a probability of multidimensional printing failure according to an embodiment.

Referring to FIG. 2, an operational flowchart illustrating a process 200 that splits a multidimensional print job according to a probability of multidimensional printing failure is depicted according to at least one embodiment. At 202, a virtual printing model of a multidimensional object for printing may be obtained that consists of print layers. The object may be manually selected by a user to be printed or by an automated process and there are no restrictions on the type of object, which may include, for example, parts for larger items such as an automobile or appliance or smaller items such as chess pieces or prototypes of any sort of design. It is only required for the object to be suitable for realization in the multidimensional environment and that the virtual printing model express the multidimensional realization. The virtual printing model may be in the form of a file that may be ready for sending to a specific multidimensional printer or in some digital form that may be analyzed by the model splitting module 150. As mentioned above, it may be common for the virtual printing model to be split into print layers for multidimensional printing, such that the print layers may print separately and collectively build the physical realization of the multidimensional object. There may be hundreds or even thousands of printing print layers that may be created and these print layers may represent various locations of the multidimensional object. Also, while there is no restriction on what the multidimensional object is, the object may be identified at this step for later analysis in creating a "use-case profile" of the object in the determination of order for the print layers, which will be described below.

At 204, the multidimensional object may be analyzed such that a printing risk score may be determined for various locations on the object, where specific locations may be identified that may have the printing risk score determined to be above a printing risk threshold. According to an embodiment, the printing risk score and the printing risk threshold may be used to provide an indication of a risk of printing failure for a multidimensional object, whereby a location with a printing risk score above the printing risk threshold may indicate the presence of a risk of printing failure, where a higher printing risk score may further indicate a higher risk of printing failure. When the printing risk scores for multiple locations may be identified above the printing risk threshold, the identified locations may further be sorted and ranked using the printing risk score in an order with the highest risk first.

In an embodiment, a supervised machine learning model may be trained to predict the risk of printing failure for a multidimensional object. Printing risk may be manifested in any of several ways: for example, the model's geometry may indicate certain areas of the model that may be more likely to fail, e.g., the smaller area in the middle of the hourglass as described above. Also included in a calculation of printing risk may be factors that are not specific to the object, such as the choice of a specific printer or filament material used in the printer. One or more of the following machine learning algorithms may be used: logistic regression, naive Bayes, support vector machines, deep neural networks, random forest, decision tree, gradient-boosted trec, multi-layer perceptron. In an embodiment, an ensemble machine learning technique may be employed that uses multiple machine learning algorithms together to assure better classification when compared with the classification of a single machine learning algorithm. In this embodiment, training data for the model may not be limited to an analysis of the multidimensional object but may also include a profile of a connected multidimensional printer, including an understanding of the filament material loaded in the printer, and also crowdsourcing, such as results of prior attempts to print the object on the same or similar printer or any attempt to print the object. The crowdsourcing data that may be used to train the model and calculate the printing risk score may also be used to identify specific locations on a specific virtual printing model that may historically contain flaws or defects, and, in these prior print jobs, which points users usually stop their multidimensional printers and start over. The model splitting module 150 may use this data to weight the printing risk score for those locations and therefore influence which print layers may be sent to the printer first. The training data may be collected from a single attempt to print the multidimensional object or single printer or user or from multiple attempts or printers or users over a longer period of time. The results may be stored in a database so that the data is most current, and the output would always be up to date.

In a further embodiment, a supervised machine learning model may be trained to predict and set the printing risk threshold using the same or similar method as above, where the training data may include single or multiple print jobs over time to determine a point where printing failure may be most common with the printing technology currently in use with respect to a multidimensional object.

In an embodiment, crowdsourcing data may be used to build a use-case profile and classify a multidimensional object that may be represented by a virtual printing model based on a type of object. This may allow the model splitting module 150 to identify specific vulnerabilities and printing risk that a user may prioritize, e.g., risk of a structural defect or perhaps risk of a visual flaw. As an example, in the case of certain types, such as tools, a user may not care about risks of visual defects as long as the structural integrity is intact, where risk of loss in dexterity and breakage may be most important. The classification or categorization of the object by type may then be used to identify locations and rank multiple locations if more than one location is identified, of the virtual printing model based on prioritized risk. In this way, a "use-case profile" may be created for the multidimensional object that may be used to pinpoint printing vulnerability and risk criteria for the multidimensional object, for instance pre-determining and applying a default weight or printing risk score in the calculation of the printing risk score for specific locations on the multidimensional object. It should be noted that even though a default printing risk score may be calculated and used at this step, users would have the ability to manually override and provide feedback to the model splitting module 150 in the manner that will also be described below with respect to the sets of print layers sent to the multidimensional printer.

It should be noted that the crowdsourced training data described above may also be utilized to assess user success results for successfully printing various multidimensional objects using virtual printing models. This training data can then be used to recommend and auto-select higher-grade filament materials for the specific, most vulnerable locations of a virtual printing model to assure a successful print in this location, where the possibly more expensive and higher-grade filament might be necessary for printing this specific part of the model. In a wider network of users and printers, this training data can also be used to select and assign the vulnerable location's print job to the printer containing the appropriate filament material in a multi-filament tray to successfully print this location. Alternatively, if no recommendable filament material is available, the model splitting module 150 may also recommend to the user a filament material for purchase for the specific location that may have been identified with a high printing risk score.

At 206, a set of print layers associated with the location on the multidimensional object may be identified, where the printing risk score may be determined to be above the printing risk threshold for the location. This may be accomplished by analyzing the print job and determining which print layers may be required to print a portion of the object that most closely maps to the location that has been determined to have a printing risk score above the threshold. These print layers may then be grouped into a set, where the set may be indicated within the model as associated with the location with a high printing risk score. In the case of multiple locations being identified, the print layers may be separately grouped into sets and marked with separate indicators that also may indicate the rank of the individual locations.

At 208, in conjunction with a print job being sent to a multidimensional printer, the model splitting module 150 may prioritize the print layers being sent to the printer by sending the identified sets of print layers first, i.e., sending the identified set of print layers before remaining print layers that may be associated with locations having a printing risk score below the printing risk threshold. In the case of multiple sets of print layers being identified, the set of print layers with the highest rank, or highest printing risk score above the threshold, may be sent first, again assuring that the sending of print layers to the multidimensional printer be ordered by the rank. Also at this step, if a print job is identified as being completed by multiple printers, where pieces of a multidimensional object may be printed and then later connected to one another, the identified sets of print layers may be sent to one printer, while remaining print layers may be sent to a second printer. It is important to note that there is no specific requirement for splitting a print job between printers, only that locations and sets of print layers with high printing risk are sent prior to those locations or sets of print layers with lower printing risk. A multidimensional printing software program may make decisions on exactly how a print job may be completed using the available hardware and filament material.

Included at this step may be a feedback mechanism, whereby the interaction of a user with the virtual printing model and the output of the model splitting module 150 may be monitored and used to refine the machine learning model that may be used to predict printing risk through the calculation of the printing risk score and to calculate and set the printing risk threshold that may be used to identify locations of the virtual printing model that may be printed first or that have high probability of printing failure. In the case of multiple locations identified by the machine learning, a user may also view and edit rankings of locations or sets of printing print layers and any editing may be sent back to the machine learning model to refine the machine learning. Also at this step, once a virtual printing model has been split into sets of print layers that may represent an order of a single print job or isolated print jobs, the highest risk printing, or first set of print layers as determined by the model splitting module 150, may first be assigned to a first printer in the network, e.g., a printer with higher quality filament material appropriate for the location on the multidimensional object that is mapped to the set or print layers of the virtual printing model. Remaining sets of print layers may then be assigned to a second printer in the network such that printing of lower risk mapped print layers may be delayed until the high risk of vulnerability print jobs have completed and have been approved by the user. In addition, the model splitting module 150 may be aware of the printing status of the initial print job and, if a printing failure has been detected, the module 150 may block printing of the remaining print layers so that the locations on the multidimensional object with the highest risk may be printed prior to any other print jobs.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for splitting multidimensional print jobs according to a probability of multidimensional printing failure, the computer-implemented method comprising:

receiving a virtual printing model of a multidimensional object, wherein the virtual printing model comprises print layers for a multidimensional printer;

splitting the virtual printing model into sets of print layers, wherein each set of print layers corresponds to a location of the multidimensional object that are sized according to requirements of the multidimensional printer;

determining a printing risk score for each location on the multidimensional object;

determining at least one of the printing risk score being above a printing threshold, identifying a set of print layers of the virtual printing model as a vulnerable location on the multidimensional object based on the at least one of the printing risk score being above a printing threshold;

sending the set of print layers associated with the vulnerable location of the virtual printing model to a first printer in decreasing order of printing risk score;

sending remaining print layers of the virtual printing model to a second printer; and detecting a print failure at the first printer;

in response to detecting the print failure at the first printer, blocking the second printer from printing the remaining print layers of the virtual printing model.

2. The computer-implemented method of claim 1, further comprising:

determining that a first printing risk score for a first location on the multidimensional object is higher than a second printing risk score for a second location on the multidimensional object, wherein both the first printing risk score and the second printing risk score are above the printing risk threshold;

identifying a first set of print layers of the virtual printing model associated with the first location on the multidimensional object and a second set of print layers of the virtual printing model associated with the second location on the multidimensional object; and sending the first set of print layers of the virtual printing model to the multidimensional printer prior to the second set of print layers of the virtual printing model.

3. The computer-implemented method of claim 1, wherein the determining the printing risk score for the location on the multidimensional object further comprises using a machine learning model to predict the probability of multidimensional printing failure based on crowdsourced object printing failure data.

4. The computer-implemented method of claim 1, further comprising:

displaying the virtual printing model of the multidimensional object to a user, wherein a displayed virtual printing model includes an indication of the location on the multidimensional object;

monitoring user interactions with the location on the multidimensional object; and updating the printing risk score for the location on the multidimensional object based on the user interactions.

5. The computer-implemented method of claim 1, further comprising:

identifying a type of the multidimensional object; and updating the printing risk score for the location on the multidimensional object based on an identified type of multidimensional object.

6. The computer-implemented method of claim 1, further comprising generating a recommendation for a filament material to be used at the location on the multidimensional object based on the printing risk score for the location on the multidimensional object.

7. A computer system for splitting multidimensional print jobs according to a probability of multidimensional printing failure, the computer system comprising:

one or more processors, one or more computer-readable memories, and one or more computer-readable storage media;

program instructions, stored on at least one of the one or more computer-readable storage media, when executed by at least one of the one or more processors via at least one of the one or more computer-readable memories, cause at least one of the one or more processors to receive a virtual printing model of a multidimensional object, wherein the virtual printing model comprises print layers for a multidimensional printer;

program instructions, stored on at least one of the one or more computer-readable storage media, when executed by at least one of the one or more processors via at least one of the one or more computer-readable memories, cause at least one of the one or more processors to split the virtual printing model into sets of print layers, wherein each set of print layers corresponds to a location of the multidimensional object that are sized according to requirements of the multidimensional printer;

program instructions, stored on at least one of the one or more computer-readable storage media, when executed by at least one of the one or more processors via at least one of the one or more computer-readable memories, cause at least one of the one or more processors to determine a printing risk score for each location on the multidimensional object;

program instructions, stored on at least one of the one or more computer-readable storage media, when executed by at least one of the one or more processors via at least one of the one or more computer-readable memories, cause at least one of the one or more processors to, in response to the printing risk score being above a printing risk threshold, identify the set of print layers of the virtual printing model as a vulnerable location on the multidimensional object;

program instructions, stored on at least one of the one or more computer-readable storage media, when executed by at least one of the one or more processors via at least one of the one or more computer-readable memories, cause at least one of the one or more processors to send the set of print layers associated with the vulnerable location of the virtual printing model to a first printer in decreasing order of printing risk score;

program instructions, stored on at least one of the one or more computer-readable storage media, when executed by at least one of the one or more processors via at least one of the one or more computer-readable memories, cause at least one of the one or more processors to send remaining print layers of the virtual printing model to a second printer; and program instructions, stored on at least one of the one or more computer-readable storage media, when executed by at least one of the one or more processors via at least one of the one or more computer-readable memories, cause at least one of the one or more processors to, in response to detecting a print failure at the first printer, blocking the second printer from printing the remaining print layers of the virtual printing model.

8. The computer system of claim 7, further comprising:

program instructions, stored on at least one of the one or more computer-readable storage media, when executed by at least one of the one or more processors via at least one of the one or more computer-readable memories, cause at least one of the one or more processors to determine that a first printing risk score for a first location on the multidimensional object is higher than a second printing risk score for a second location on the multidimensional object, wherein both the first printing risk score and the second printing risk score are above the printing risk threshold;

program instructions, stored on at least one of the one or more computer-readable storage media, when executed by at least one of the one or more processors via at least one of the one or more computer-readable memories, cause at least one of the one or more processors to identify a first set of print layers of the virtual printing model associated with the first location on the multidimensional object and a second set of print layers of the virtual printing model associated with the second location on the multidimensional object; and program instructions, stored on at least one of the one or more computer-readable storage media, when executed by at least one of the one or more processors via at least one of the one or more computer-readable memories, cause at least one of the one or more processors to send the first set of print layers of the virtual printing model to the multidimensional printer prior to the second set of print layers of the virtual printing model.

9. The computer system of claim 7, wherein the determining the printing risk score for the location on the multidimensional object further comprises using a machine learning model to predict the probability of multidimensional printing failure based on crowdsourced object printing failure data.

10. The computer system of claim 7, further comprising:

program instructions, stored on at least one of the one or more computer-readable storage media, when executed by at least one of the one or more processors via at least one of the one or more computer-readable memories, cause at least one of the one or more processors to display the virtual printing model of the multidimensional object to a user, wherein a displayed virtual printing model includes an indication of the location on the multidimensional object;

program instructions, stored on at least one of the one or more computer-readable storage media, when executed by at least one of the one or more processors via at least one of the one or more computer-readable memories, cause at least one of the one or more processors to monitor user interactions with the location on the multidimensional object; and program instructions, stored on at least one of the one or more computer-readable storage media, when executed by at least one of the one or more processors via at least one of the one or more computer-readable memories, cause at least one of the one or more processors to update the printing risk score for the location on the multidimensional object based on the user interactions.

11. The computer system of claim 7, further comprising:

program instructions, stored on at least one of the one or more computer-readable storage media, when executed by at least one of the one or more processors via at least one of the one or more computer-readable memories, cause at least one of the one or more processors to identify a type of the multidimensional object; and program instructions, stored on at least one of the one or more computer-readable storage media, when executed by at least one of the one or more processors via at least one of the one or more computer-readable memories, cause at least one of the one or more processors to update the printing risk score for the location on the multidimensional object based on an identified type of multidimensional object.

12. The computer system of claim 7, further comprising generating a recommendation for a filament material to be used at the location on the multidimensional object based on the printing risk score for the location on the multidimensional object.

13. A computer program product for splitting multidimensional print jobs according to a probability of multidimensional printing failure, the computer program product comprising:

program instructions, stored on at least one of the one or more computer-readable storage media, when executed by at least one of one or more processors via at least one of the one or more computer-readable memories, cause at least one of the one or more processors to receive a virtual printing model of a multidimensional object, wherein the virtual printing model comprises print layers for a multidimensional printer;

program instructions, stored on at least one of the one or more computer-readable storage media, when executed by at least one of the one or more processors via at least one of the one or more computer-readable memories, cause at least one of the one or more processors to split the virtual printing model into sets of print layers, wherein each set of print layers corresponds to a location of the multidimensional object that are sized according to requirements of the multidimensional printer;

program instructions, stored on at least one of the one or more computer-readable storage media, when executed by at least one of the one or more processors via at least one of the one or more computer-readable memories, cause at least one of the one or more processors to determine a printing risk score for each location on the multidimensional object;

program instructions, stored on at least one of the one or more computer-readable storage media, when executed by at least one of the one or more processors via at least one of the one or more computer-readable memories, cause at least one of the one or more processors to, in response to the printing risk score being above a printing risk threshold, identify the set of print layers of the virtual printing model as a vulnerable location on the multidimensional object;

program instructions, stored on at least one of the one or more computer-readable storage media, when executed by at least one of the one or more processors via at least one of the one or more computer-readable memories, cause at least one of the one or more processors to send the set of print layers associated with the vulnerable location of the virtual printing model to a first printer in decreasing order of printing risk score;

program instructions, stored on at least one of the one or more computer-readable storage media, when executed by at least one of the one or more processors via at least one of the one or more computer-readable memories, cause at least one of the one or more processors to send remaining print layers of the virtual printing model to a second printer; and program instructions, stored on at least one of the one or more computer-readable storage media, when executed by at least one of the one or more processors via at least one of the one or more computer-readable memories, cause at least one of the one or more processors to, in response to detecting a print failure at the first printer, blocking the second printer from printing the remaining print layers of the virtual printing model.

14. The computer program product of claim 13, further comprising:

program instructions, stored on at least one of the one or more computer-readable storage media, when executed by at least one of the one or more processors, cause at least one of the one or more processors to determine that a first printing risk score for a first location on the multidimensional object is higher than a second printing risk score for a second location on the multidimensional object, wherein both the first printing risk score and the second printing risk score are above the printing risk threshold;

program instructions, stored on at least one of the one or more computer-readable storage media, when executed by at least one of the one or more processors, cause at least one of the one or more processors to identify a first set of print layers of the virtual printing model associated with the first location on the multidimensional object and a second set of print layers of the virtual printing model associated with the second location on the multidimensional object; and program instructions, stored on at least one of the one or more computer-readable storage media, when executed by at least one of the one or more processors, cause at least one of the one or more processors to send the first set of print layers of the virtual printing model to the multidimensional printer prior to the second set of print layers of the virtual printing model.

15. The computer program product of claim 13, wherein the determining the printing risk score for the location on the multidimensional object further comprises using a machine learning model to predict the probability of multidimensional printing failure based on crowdsourced object printing failure data.

16. The computer program product of claim 13, further comprising:

program instructions, stored on at least one of the one or more computer-readable storage media, when executed by at least one of the one or more processors, cause at least one of the one or more processors to display the virtual printing model of the multidimensional object to a user, wherein a displayed virtual printing model includes an indication of the location on the multidimensional object;

program instructions, stored on at least one of the one or more computer-readable storage media, when executed by at least one of the one or more processors, cause at least one of the one or more processors to monitor user interactions with the location on the multidimensional object; and program instructions, stored on at least one of the one or more computer-readable storage media, when executed by at least one of the one or more processors, cause at least one of the one or more processors to update the printing risk score for the location on the multidimensional object based on the user interactions.

17. The computer program product of claim 13, further comprising:

program instructions, stored on at least one of the one or more computer-readable storage media, when executed by at least one of the one or more processors, cause at least one of the one or more processors to identify a type of the multidimensional object; and program instructions, stored on at least one of the one or more computer-readable storage media, when executed by at least one of the one or more processors, cause at least one of the one or more processors to update the printing risk score for the location on the multidimensional object based on an identified type of multidimensional object.

* * * * *